(12) United States Patent
Cross et al.

(10) Patent No.: US 7,399,456 B2
(45) Date of Patent: Jul. 15, 2008

(54) PROCESS FOR THE REMOVAL OF HEAVY METALS FROM GASES, AND COMPOSITIONS THEREFOR AND THEREWITH

(75) Inventors: Joseph B. Cross, Bartlesville, OK (US); Marvin M. Johnson, Bartlesville, OK (US); Glenn W. Dodwell, Bartlesville, OK (US); Edward L. Sughrue, II, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 415 days.

(21) Appl. No.: 11/066,410

(22) Filed: Feb. 25, 2005

(65) Prior Publication Data

US 2006/0193763 A1     Aug. 31, 2006

(51) Int. Cl.
*B01D 53/64* (2006.01)
*B01J 27/198* (2006.01)

(52) U.S. Cl. .................. 423/210; 502/209; 502/353; 502/400; 502/439; 502/514; 502/516

(58) Field of Classification Search ........... 502/209, 502/353, 400, 439, 514, 516; 423/210
See application file for complete search history.

(56) References Cited

U.S. PATENT DOCUMENTS

| | | | | | |
|---|---|---|---|---|---|
| 2,773,838 | A | * | 12/1956 | Sidebotham et al. | 549/259 |
| 2,773,921 | A | * | 12/1956 | Rylander, Jr. et al. | 585/466 |
| 3,031,508 | A | * | 4/1962 | Etherington, Jr. et al. | 568/476 |
| 3,105,812 | A | * | 10/1963 | Flinn et al. | 208/254 R |
| 3,156,707 | A | * | 11/1964 | Kerr | 549/259 |
| 3,906,009 | A | * | 9/1975 | Farha, Jr. | 549/505 |
| 3,907,707 | A | * | 9/1975 | Raffelson et al. | 502/209 |
| 4,100,106 | A | * | 7/1978 | Stefani et al. | 502/209 |
| 4,101,631 | A | | 7/1978 | Ambrosini et al. | 423/210 |
| 4,474,896 | A | | 10/1984 | Chao | 502/216 |
| 4,801,567 | A | * | 1/1989 | Moorehead | 502/77 |
| 4,874,525 | A | | 10/1989 | Markovs | 210/673 |
| 5,223,145 | A | | 6/1993 | Markovs | 210/673 |
| 5,354,357 | A | | 10/1994 | Markovs et al. | 75/670 |
| 5,409,522 | A | | 4/1995 | Durham et al. | 75/670 |
| 5,607,496 | A | | 3/1997 | Brooks | 75/670 |
| 5,932,746 | A | * | 8/1999 | Herron et al. | 549/260 |
| 6,027,697 | A | | 2/2000 | Kurihara et al. | 422/171 |
| 6,136,281 | A | | 10/2000 | Meischen et al. | 423/210 |
| 6,174,833 | B1 | * | 1/2001 | Bertola et al. | 502/209 |
| 6,248,217 | B1 | | 6/2001 | Biswas et al. | 204/157.4 |

* cited by examiner

*Primary Examiner*—Timothy C. Vanoy
(74) *Attorney, Agent, or Firm*—Jeffrey R. Anderson

(57) ABSTRACT

A composition, containing vanadium, phosphorus and a support is disclosed. A method of preparing such composition is also disclosed. The composition is employed in a process to remove a heavy metal from a gaseous feed stream which can optionally include a separate heavy metal adsorption stage.

55 Claims, No Drawings

PROCESS FOR THE REMOVAL OF HEAVY METALS FROM GASES, AND COMPOSITIONS THEREFOR AND THEREWITH

The invention relates to a composition useful in the removal of heavy metals from a gaseous feed stream. In one aspect the invention relates to a method of preparing such composition. In yet another aspect the invention relates to a process for removing heavy metals from a gas stream using the inventive composition and, optionally, a second stage adsorption of the heavy metal.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants, chemical plants and petroleum refineries, will be reduced by future legislation. While a variety of adsorbents are available for capture of heavy metals (in particular mercury), these adsorbents tend to have low capacities and are easily deactivated by other components in the gas stream, such as sulfur and nitrogen oxides. We have discovered a material that converts an elemental heavy metal to an oxidation state greater than zero, even in the presence of sulfur and nitrogen oxides.

SUMMARY OF THE INVENTION

It is an object of this invention to provide an improved vanadium and phosphorous containing material which when used in the removal of heavy metal results in oxidation of the heavy metal to an oxidation state greater than zero, even in the presence of sulfur and nitrogen oxides.

A further object of this invention is to provide a method for making an improved vanadium and phosphorous containing material which when used in the removal of heavy metal results in oxidation of the heavy metal to an oxidation state greater than zero, even in the presence of sulfur and nitrogen oxides.

Another object of this invention is to provide an improved process for the removal of heavy metal from a heavy metal-containing gas which results in oxidation of the heavy metal to an oxidation state greater than zero, even in the presence of sulfur and nitrogen oxides, with an optional second stage for adsorption of oxidized heavy metal.

In accordance with a first embodiment of the invention, the inventive composition comprises vanadium, phosphorous and a support selected from the group consisting of: 1) amorphous silica-alumina; 2) a zeolite; 3) a material comprising meta-kaolin, alumina, and expanded perlite; 4) alumina; and 5) combinations thereof.

In accordance with a second embodiment of the invention, the inventive composition can be prepared by the method of:

a) incorporating a vanadium compound onto, into, or onto and into a support selected from the group consisting of: 1) amorphous silica-alumina; 2) a zeolite; 3) a material comprising meta-kaolin, alumina, and expanded perlite; 4) alumina; and 5) combinations thereof, in the presence of an oxidizing agent and a solvent, to thereby form a vanadium incorporated support; and b) incorporating a phosphorous compound onto, into, or onto and into the vanadium incorporated support, to thereby form a phosphorous and vanadium incorporated support; and c) calcining the phosphorous and vanadium incorporated support.

In accordance with a third embodiment of the invention, the inventive composition can be used in the removal of heavy metal from a gaseous feed stream comprising heavy metal by contacting, in a contacting zone, the gaseous feed stream with any of the inventive compositions of embodiments one or two above, with an optional second stage for adsorption of oxidized heavy metal.

Other objects and advantages of the invention will become apparent from the detailed description and the appended claims.

DETAILED DESCRIPTION OF THE INVENTION

The inventive composition comprises, consists of, or consists essentially of a support, phosphorous and vanadium.

The support is selected from the group consisting of: 1) amorphous silica-alumina; 2) a zeolite; 3) a material comprising, consisting of or consisting essentially of alumina, expanded perlite and meta-kaolin; 4) alumina; and 5) combinations thereof. As used in this disclosure, the term "Support" refers to a carrier for another catalytic component. However, by no means is a support necessarily an inert material; it is possible that a support can contribute to catalytic activity and selectivity.

The vanadium is present in the composition, on an elemental vanadium basis, in an amount in the range of from about 0.5 to about 50 weight %, preferably from about 1 to about 20 weight %, and most preferably from about 1.5 to about 15 weight %, based on the total weight of the composition.

The phosphorous is present in the composition, on an elemental phosphorous basis, in an amount in the range of from about 0.5 to about 50 weight %, preferably from about 1 to about 20 weight %, and most preferably from about 1.5 to about 15 weight %, based on the total weight of the composition.

In accordance with the second embodiment of the present invention, the inventive composition can be prepared by the method of, and a method is provided including:

a) incorporating a vanadium compound onto, into, or onto and into a support selected from the group consisting of: 1) amorphous silica-alumina; 2) a zeolite; 3) a material comprising, consisting of or consisting essentially of alumina, expanded perlite and meta-kaolin; 4) alumina; and 5) combinations thereof, in the presence of an oxidizing agent and a solvent, to thereby form a vanadium incorporated support;

b) incorporating a phosphorous compound onto, into, or onto and into the vanadium incorporated support, to thereby form a phosphorous and vanadium incorporated support; and c) calcining the phosphorous and vanadium incorporated support.

The calcination temperature is preferably sufficient to volatilize and remove substantially all of the solvent, more preferably greater than about 125° C., and most preferably greater than about 150° C.; and is also preferably below about 400° C.; even more preferably below about 375° C.; and most preferably below about 350° C.

The composition is preferably heated, as described above, for a time period in the range of from about 0.1 hours to about 24 hours, and more preferably in the range of from about 1 hour to about 4 hours.

The vanadium compound can be any vanadium containing compound capable of incorporation onto and/or into a support. Preferably, the vanadium compound is selected from the group consisting of 1) ammonium metavanadate, 2) an alkali metavanadate of the formula $MVO_3$, wherein M can be an alkali metal selected from Group IA, and combinations thereof; and 3) combinations of any two or more thereof. The most preferable vanadium compound is ammonium metavanadate.

The phosphorous compound can be any phosphorous containing compound capable of incorporation onto and/or into a support. Preferably, the phosphorous compound is selected from the group consisting of: 1) phosphoric acid; 2) phosphorous pentoxide ($P_2O_5$); 3) an ammonium phosphate; 4) ammonium phosphite; and 5) combinations thereof.

The oxidizing agent can be any agent capable of oxidizing vanadium, and preferably is hydrogen peroxide or oxygen. The solvent is preferably an aqueous solution of oxalic acid.

Also, preferably the support comprises alumina, meta-kaolin, and expanded perlite, and is prepared by the method of:

1) adding expanded perlite to a mixture of alumina and water to thereby form a second mixture;

2) adding meta-kaolin to the second mixture to thereby form a third mixture;

3) adding a dispersant to the third mixture to thereby form a fourth mixture; and 4) calcining the fourth mixture to thereby form the support.

The calcining of step 4) preferably comprises heating the fourth mixture to a temperature in the range of from about 100° C. to about 200° C. for a first time period in the range of from about 0.5 hour to about 2 hours; and subsequently heating the fourth mixture to a temperature in the range of from about 500° C. to about 750° C. for a second time period in the range of from about 0.5 hour to about 2 hours.

In accordance with the third embodiment of the present invention, the inventive composition can be used in the removal of heavy metal from a gaseous feed stream comprising heavy metal by a process comprising, consisting of, or consisting essentially of contacting, in a contacting zone, under heavy metal removal conditions, the gaseous feed stream with any of the inventive compositions, and combinations thereof, of embodiments one through two above. A gaseous product stream is withdrawn from the contacting zone. The gaseous feed stream is typically a combustion gas; and is more typically a stack gas derived from the combustion of coal. The gaseous feed stream can also further comprise compounds selected from the group consisting of sulfur oxides, $CO_2$, water, nitrogen oxides, HCl, and combinations of any two or more thereof.

The contacting of the gaseous feed stream with the inventive composition is preferably carried out at a temperature in the range of from about 100 to about 325° C., more preferably from about 110 to about 275° C., and most preferably from about 120 to about 225° C.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the gaseous feed stream in an amount in the range of from about 0.1 to about 10,000 $\mu m/^3$, more typically in the range of from about 1 to about 800 $\mu g/m^3$ and most typically from about 3 to about 700 $\mu g/m^3$.

The composition preferably converts at least a portion of the heavy metal in the gaseous feed stream to an elevated oxidation state. In the case of mercury, the composition preferably converts at least a portion of the mercury contained in the gaseous feed stream from a zero oxidation state to a +1 or a +2 oxidation state and also preferably removes mercury. "At least a portion", as used in this paragraph, can mean at least 20 weight %, preferably at least 30 weight %, and more preferably at least 50 weight % mercury based on the total amount of mercury contained in the gaseous feed stream.

The gaseous product stream preferably contains less than about 20 weight %, more preferably less than about 10 weight %, and most preferably less than about 5 weight % of the mercury contained in the gaseous feed stream.

The gaseous product stream is optionally contacted with a separate adsorbent in an adsorption zone. The adsorbent can be any adsorbent capable of adsorbing a heavy metal. More preferably, the adsorbent comprises, consists of or consists essentially of a material selected from the group consisting of a zeolite, amorphous carbon, and combinations thereof. The amorphous carbon can be an activated carbon or an activated charcoal. A treated gaseous product stream is withdrawn from the adsorption zone and contains less than about 20 weight %, preferably less than about 10 weight %, and more preferably less than about 5 weight % of the heavy metal contained in the gaseous feed stream.

EXAMPLES

The following examples are intended to be illustrative of the present invention and to teach one of ordinary skill in the art to make and use the invention. These examples are not intended to limit the invention in any way.

Preparation of Support

The support is prepared from alumina, perlite, and metakaolin clay. The procedure involves mixing 254 grams of Vista Dispal alumina, 900 grams of de-ionized water, and 300 grams of expanded crushed perlite. To this slurry, 820 grams of ASP-600 metakaolin clay from Engelhard and 240 grams of Darvan 821A are added. The material is then heated to 150° C., held there for one hour, and heated to 600° C. for 8 to 10 hours. This material is ground to 10 to 20 mesh particles before the impregnation step.

Preparation of Sorbents

The preparation of the sorbents involves the addition of vanadium and phosphorus or just vanadium to the support above. To a solution of ammonium metavanadate ($NH_4VO_3$) in 2 molar oxalic acid, a few drops of hydrogen peroxide (30 wt %) are added. (The red color of the solution suggests that vanadium is in +5 oxidation state). The vanadium solution is then impregnated onto the support by incipient wetness using one-third of the solution in three separate steps. Between impregnation steps, the vanadium-impregnated support is heated to 120° C. in a drying oven for one hour. After the three separate impregnation and drying steps, the sorbent is impregnated with either a solution of phosphoric acid ($H_3PO_4$) in water (Sorbent A) or a solution of diammonium phosphate in water (Sorbent B). Sorbent A was then dried at 120° C. for one hour. Sorbent B was split into three different portions which were calcined for three hours at 300° C., 450° C. and 700° C., respectively. These sorbents contain 15 wt %

$V_2O_5$ and 5 wt % $P_2O_5$. For comparison purposes, a 15 wt % $V_2O_5$ sorbent was prepared without phosphorus by eliminating the fourth impregnation step (Sorbent C).

Evaluation of Sorbents to Remove Mercury

The following procedure is used to test the ability of the sorbent to remove mercury from a gas stream. Mercury is added by passing a dry air stream at room temperature through a gas bottle containing elemental mercury. The mercury-containing stream is then passed through a sample tube containing approximately 0.4 grams of the sorbent to be tested at a gas hourly space velocity of 10,000 (approximately 40 to 50 ml/min). The tube is located in a furnace held at a temperature of around 150° C. The inlet and outlet elemental mercury concentrations are measured using a Jerome Mercury Analyzer. The efficiency of mercury removal is determined from the amount of mercury entering and leaving the solid sorbent, and is defined as the difference between the inlet and outlet mercury concentrations divided by the inlet concentration.

Sorbents A and C

Table 1 below summarizes the results obtained when passing mercury in dry air over various sorbents. Sorbents A and C were tested as prepared (i.e., 10 to 20 mesh) and ground and sieved to produce 20 to 40 mesh particles. The removal efficiency is determined as a function of mercury uptake; i.e., the cumulative amount of mercury already adsorbed on the sample in units of micrograms of mercury per gram of sorbent (µg/g).

TABLE 1

Mercury Removal Efficiency

| Sorbent | Wt % V | Wt % P | Mesh Size | Mercury Uptake (µg/g) | Removal Efficiency (%) |
|---------|--------|--------|-----------|----------------------|------------------------|
| A | 15 | 5 | 10-20 | 200 | 95 |
|   |    |   |       | 1000 | 97 |
| A | 15 | 5 | 20-40 | 200 | 96 |
|   |    |   |       | 1000 | 99 |
|   |    |   |       | 3000 | 98 |
| C | 15 | — | 10-20 | 200 | 83 |
|   |    |   |       | 1000 | 95 |
|   |    |   |       | 2000 | 96 |
| C | 15 | — | 20-40 | 200 | 96 |
|   |    |   |       | 1000 | 99 |
|   |    |   |       | 3000 | 96 |

The results in Table 1 indicate that the efficiency of mercury removal depends upon mercury uptake as well as other properties of the sorbent. For example, the 20 to 40 mesh particles appear to be more effective for mercury removal. In addition, the presence of phosphorus appears to have a positive effect on performance.

Sorbent B

Table 2 below summarizes results obtained when passing mercury in dry air over various Sorbent B portions calcined at differing temperatures. The removal efficiency is determined as a function of mercury uptake; i.e., the cumulative amount of mercury already adsorbed on the sample in units of micrograms of mercury per gram of sorbent (µg/g).

TABLE 2

Mercury Removal Efficiency

| Wt % V | Wt % P | Calcination Temperature (° C.) | Mercury Uptake (µg/g) | Removal Efficiency (%) |
|--------|--------|-------------------------------|----------------------|------------------------|
| 15 | 5 | 300 | 162 | 99.8 |
|    |   |     | 440 | 100 |
|    |   |     | 455* | 97.8 |
|    |   |     | 487 | 87.7 |
|    |   |     | 590 | 97.6 |
|    |   |     | 964 | 99.4 |
| 15 | 5 | 450 | 17 | 98.3 |
|    |   |     | 46 | 81.6 |
|    |   |     | 192 | 30.7 |
| 15 | 5 | 700 | 19 | 96.1 |
|    |   |     | 60 | 95.8 |
|    |   |     | 442 | 60 |

*Begin adding moisture to air for this run.

The results in Table 2 indicate that the efficiency of mercury removal depends upon mercury uptake as well as the calcination temperature. For example, the portion of Sorbent at 300° C. was most effective for mercury removal.

Reasonable variations, modifications and adaptations can be made within the scope of the disclosure and appended claims without departing from the scope of the present invention.

That which is claimed is:

1. A method comprising;
   a) incorporating a vanadium compound onto, into, or onto and into a support selected from the group consisting of: amorphous silica-alumina; a zeolite; a material comprising alumina, expanded perlite, and meta-kaolin; alumina; and combinations thereof, in the presence of an oxidizing agent and a solvent, to thereby form a vanadium incorporated support;
   b) incorporating a phosphorous compound onto, into, or onto and into said vanadium incorporated support, to thereby form a phosphorous and vanadium incorporated support; and
   c) calcining said phosphorous and vanadium incorporated support at a calcination temperature; wherein said calcination temperature is sufficient to volatilize and remove substantially all of the solvent; and wherein said calcination temperature is below about 400° C., to thereby form said composition.

2. A method in accordance with claim 1 wherein said solvent is an aqueous solution of oxalic acid.

3. A method in accordance with claim 1 wherein said vanadium incorporated support is calcined for a time period in the range of from about 0.1 to about 24 hours.

4. A method in accordance with claim 1 wherein vanadium is present in said composition, on elemental vanadium basis, in an amount in the range of from about 0.5 to about 50 wt. percent, and wherein phosphorous is present in said composition, on an elemental phosphorous basis, in an amount in the range of from about 0.5 to about 50 wt. percent, based on the total weight of said composition.

5. A method in accordance with claim 1 wherein vanadium is present in said composition, on elemental vanadium basis, in an amount in the range of from about 1.0 to about 20 wt. percent, and wherein phosphorous is present in said composition, on an elemental phosphorous basis, in an amount in the range of from about 1.0 to about 20 wt. percent, based on the total weight of said composition.

6. A method in accordance with claim 1 wherein vanadium is present in said composition, on elemental vanadium basis, in an amount in the range of from about 1.5 to about 15 wt. percent, and wherein phosphorous is present in said composition, on an elemental phosphorous basis, in an amount in the range of from about 1.5 to about 15 wt. percent, based on the total weight of said composition.

7. A method in accordance with claim 1 wherein said oxidizing agent is hydrogen peroxide.

8. A method in accordance with claim 1 wherein said vanadium compound is selected from the group consisting of: 1) ammonium metavanadate, 2) an alkali metavanadate of the formula $MVO_3$, wherein M can be an alkali metal selected from Group IA, and combinations thereof; and 3) combinations of any two or more thereof.

9. A composition in accordance with claim 1 wherein said phosphorous compound is selected from the group consisting of: 1) phosphoric acid; 2) phosphorous pentoxide; 3) an ammonium phosphate; 4) ammonium phosphite; and 5) combinations thereof.

10. A process comprising:
a) contacting, in a contacting zone, a gaseous feed stream comprising a heavy metal and oxygen with a composition comprising vanadium, phosphorous and a support selected from the group consisting of amorphous silica-alumina; a zeolite; a material comprising alumina, expanded perlite and meta-kaolin; alumina and combinations thereof; and
b) withdrawing a gaseous product stream from said contacting zone.

11. A process as recited in claim 10 wherein said gaseous product stream contains less heavy metal than said gaseous feed stream.

12. A process as recited in claim 10 wherein said gaseous feed stream further comprises a compound selected from the group consisting of sulfur oxides, $CO_2$, water, nitrogen oxides, HCl, and combinations of any two or more thereof.

13. A process as recited in claim 10 wherein said gaseous feed stream is a combustion gas.

14. A process as recited in claim 10 wherein said gaseous feed stream is a stack gas derived from the combustion of coal.

15. A process as recited in claim 10 wherein said contacting of step a) is carried out at a temperature in the range of from about 100 to about 325° C.

16. A process as recited in claim 10 wherein said contacting of step a) is carried out at a temperature in the range of from about 125 to about 275° C.

17. A process as recited in claim 10 wherein said contacting of step a) is carried out at a temperature in the range of from about 150 to about 225° C.

18. A process as recited in claim 10 wherein said heavy metal comprises a metal selected from the group consisting of arsenic, beryllium, lead, cadmium, chromium, nickel, zinc, mercury, barium, and combinations of any two or more thereof.

19. A process as recited in claim 18 wherein said heavy metal is mercury.

20. A process as recited in claim 19 wherein said composition converts at least a portion of said mercury in said gaseous feed stream from a zero oxidation state to a +1 or a +2 oxidation state.

21. A process as recited in claim 19 wherein said mercury is present in said gaseous feed stream in an amount in the range of from about 0.1 to about 10,000 $\mu g/m^3$.

22. A process as recited in claim 19 wherein said mercury is present in said gaseous product stream in an amount in the range of from about 1 to about 800 $\mu g/m^3$.

23. A process as recited in claim 19 wherein said mercury is present in said gaseous product stream in an amount in the range of from about 3 to about 700 $\mu g/m^3$.

24. A process as recited in claim 19 wherein said gaseous product stream contains less than about 80 weight % of the mercury contained in said gaseous feed stream.

25. A process as recited in claim 19 wherein said gaseous product stream contains less than about 90 weight % of the mercury contained in said gaseous feed stream.

26. A process as recited in claim 19 wherein said gaseous product stream contains less than about 95 weight % of the mercury contained in said gaseous feed stream.

27. A process as recited in claim 10 wherein said gaseous product stream is contacted, in an adsorption zone, with an adsorbent selected from the group consisting of a zeolite, amorphous carbon, and combinations thereof.

28. A process as recited in claim 27 wherein said composition oxidizes at least a portion of said heavy metal in said gaseous feed stream to an elevated oxidation state.

29. A process as recited in claim 27 wherein said heavy metal is mercury and wherein said composition oxidizes at least a portion of said mercury in said gaseous feed stream from a zero oxidation state to a +1 or a +2 oxidation state.

30. A process as recited in claim 27 wherein a treated gaseous product stream is withdrawn from said adsorption zone, and wherein said treated gaseous product stream contains less than about 80 weight % of the heavy metal contained in the gaseous feed stream.

31. A process as recited in claim 27 wherein a treated gaseous product stream is withdrawn from said adsorption zone, and wherein said treated gaseous product stream contains less than about 90 weight % of the heavy metal contained in the gaseous feed stream.

32. A process as recited in claim 27 wherein a treated gaseous product stream is withdrawn from said adsorption zone, and wherein said treated gaseous product stream contains less than about 95 weight % of the heavy metal contained in the gaseous feed stream.

33. A process comprising:
a) contacting, in a contacting zone, a gaseous feed stream comprising a heavy metal and oxygen with a composition prepared by the method of:
i) incorporating a vanadium compound onto, into or onto and into a support selected from the group consisting of: amorphous silica-alumina; a zeolite; a material comprising alumina, expanded perlite, and meta-kaolin; alumina; and combinations thereof, in the presence of an oxidizing agent and a solvent, to thereby form a vanadium incorporated support;
ii) incorporating a phosphorous compound onto, into or onto and into said vanadium incorporated support, to thereby form a phosphorous and vanadium incorporated support; and
iii) calcining said phosphorous and vanadium incorporated support at a calcination temperature; wherein said calcination temperature is sufficient to volatilize and remove substantially all of the solvent; and wherein said calcination temperature is below about 400° C., to thereby form said composition, and
b) withdrawing a gaseous product stream from said contacting zone.

34. A process as recited in claim 33 wherein said gaseous product stream contains less heavy metal than said gaseous feed stream.

35. A process as recited in claim 33 wherein said gaseous feed stream further comprises a compound selected from the group consisting of sulfur oxides, $CO_2$, water, nitrogen oxides, HC 1, and combinations of any two or more thereof.

36. A process as recited in claim 33 wherein said gaseous feed stream is a combustion gas.

37. A process as recited in claim 33 wherein said gaseous feed stream is a stack gas derived from the combustion of coal.

38. A process as recited in claim 33 wherein said contacting of step a) is carried out at a temperature in the range of from about 100 to about 325° C.

39. A process as recited in claim 33 wherein said contacting of step a) is carried out at a temperature in the range of from about 125 to about 275° C.

40. A process as recited in claim 33 wherein said contacting of step a) is carried out at a temperature in the range of from about 150 to about 225° C.

41. A process as recited in claim 33 wherein said heavy metal comprises a metal selected from the group consisting of arsenic, beryllium, lead, cadmium, chromium, nickel, zinc, mercury, barium, and combinations of any two or more thereof.

42. A process as recited in claim 41 wherein said heavy metal is mercury.

43. A process as recited in claim 42 wherein said composition converts at least a portion of said mercury in said gaseous feed stream from a zero oxidation state to a +1 or a +2 oxidation state.

44. A process as recited in claim 42 wherein said mercury is present in said gaseous feed stream in an amount in the range of from about 0.1 to about 1000 $\mu g/m^3$.

45. A process as recited in claim 42 wherein said mercury is present in said gaseous product stream in an amount in the range of from about 1 to about 800 $\mu g/m^3$.

46. A process as recited in claim 42 wherein said mercury is present in said gaseous product stream in an amount in the range of from about 3 to about 700 $\mu g/m^3$.

47. A process as recited in claim 42 wherein said gaseous product stream contains less than about 80 weight % of the mercury contained in said gaseous feed stream.

48. A process as recited in claim 42 wherein said gaseous product stream contains less than about 90 weight % of the mercury contained in said gaseous feed stream.

49. A process as recited in claim 42 wherein said gaseous product stream contains less than about 95 weight % of the mercury contained in said gaseous feed stream.

50. A process as recited in claim 33 wherein said gaseous product stream is contacted, in an adsorption zone, with an adsorbent selected from the group consisting of a zeolite, amorphous carbon, and combinations thereof.

51. A process as recited in claim 50 wherein said composition oxidizes at least a portion of said heavy metal in said gaseous feed stream to an elevated oxidation state.

52. A process as recited in claim 50 wherein said heavy metal is mercury and wherein said composition oxidizes at least a portion of said mercury in said gaseous feed stream from a zero oxidation state to a +1 or a +2 oxidation state.

53. A process as recited in claim 50 wherein a treated gaseous product stream is withdrawn from said adsorption zone, and wherein said treated gaseous product stream contains less than about 80 weight % of the heavy metal contained in the gaseous feed stream.

54. A process as recited in claim 50 wherein a treated gaseous product stream is withdrawn from said adsorption zone, and wherein said treated gaseous product stream contains less than about 90 weight % of the heavy metal contained in the gaseous feed stream.

55. A process as recited in claim 50 wherein a treated gaseous product stream is withdrawn from said adsorption zone, and wherein said treated gaseous product stream contains less than about 95 weight % of the heavy metal contained in the gaseous feed stream.

* * * * *